(12) United States Patent
Wang

(10) Patent No.: US 6,945,115 B1
(45) Date of Patent: Sep. 20, 2005

(54) MICROMACHINED CAPACITIVE RF PRESSURE SENSOR

(75) Inventor: Yunlong Wang, Fremont, CA (US)

(73) Assignee: General Mems Corporation, Fremont, CA (US)

( * ) Notice: Subject to any disclaimer, the term of this patent is extended or adjusted under 35 U.S.C. 154(b) by 0 days.

(21) Appl. No.: 10/708,443

(22) Filed: Mar. 4, 2004

(51) Int. Cl.$^7$ .................................................. G01L 9/12
(52) U.S. Cl. ........................................................ 73/718
(58) Field of Search ................ 73/718, 724; 361/283.1, 361/283.2, 283.3, 283.4; 367/163, 181

(56) References Cited

U.S. PATENT DOCUMENTS

| | | | |
|---|---|---|---|
| 5,490,034 A | * | 2/1996 | Zavracky et al. ......... 361/283.4 |
| 5,619,476 A | | 4/1997 | Haller et al. ................ 367/181 |
| 5,672,832 A | * | 9/1997 | Cucci et al. ............ 73/861.52 |
| 5,870,351 A | | 2/1999 | Ladabaum et al. ......... 367/163 |
| 5,894,452 A | | 4/1999 | Ladabaum et al. ......... 367/163 |
| 6,087,930 A | * | 7/2000 | Kulka et al. ................ 340/447 |
| 6,470,754 B1 | * | 10/2002 | Gianchandani ............... 73/718 |
| 6,493,288 B2 | | 12/2002 | Khuri-Yakub et al. ...... 367/181 |
| 6,631,645 B1 | | 10/2003 | Satou et al. .................. 73/718 |
| 6,640,642 B1 | | 11/2003 | Onose et al. ................. 73/718 |
| 6,651,506 B2 | * | 11/2003 | Lee et al. ..................... 73/718 |

* cited by examiner

*Primary Examiner*—William Oen (57) ABSTRACT

A Capacitive Micromachined Ultrasonic RF (CMURF) pressure sensor is described. This micromachined pressure sensor has: pressure sensitive capacitance elements including a scalable array of micromachined cells of the type including electrodes carried by a sealed membrane supported above a common electrode with conductive lines interconnecting the electrodes having an electrostatic capacitance $\Delta C_m$ changing with a pressure to be detected; reference capacitance elements including a scalable array of micromachined cells of the type including electrodes carried by a stacked of membranes supported above a common electrode with conductive lines interconnecting the electrodes having an electrostatic capacitance $C_m$ not changing with the pressure. A method of operating a pressure sensor array is also described.

9 Claims, 6 Drawing Sheets

FIG_1

FIG_2

*FIG_3*

*FIG_4*

FIG_5

FIG_6

FIG_7

FIG_8

FIG_9

FIG_10

FIG_11

Figure 2:
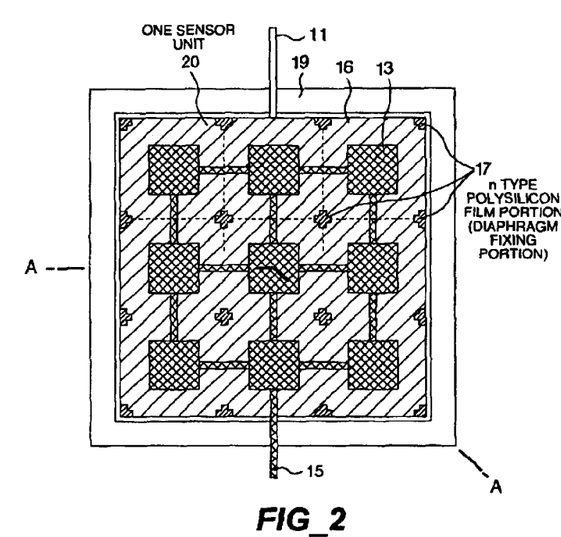
FIG. 2 is a top plan see-through view of another prior art capacitance-type pressure sensor.
Figure 3:
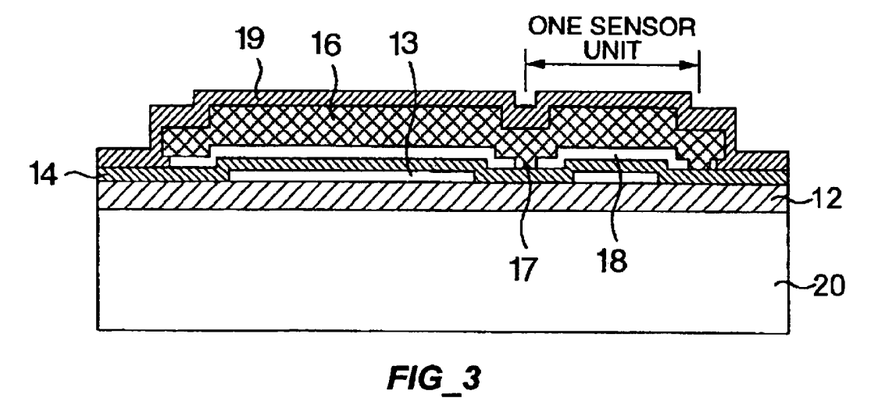
FIG. 3 is a sectional view of the same taken along a line A—A in FIG. 2.

Deposited over the n-type polysilicon film portion 16 is a silicon oxide film 19 in such a manner that the cavity region 8 is thereby vacuum-sealed, i.e., sealed off in the evacuated state. Further, a fixed electrode lead-wire 15 and a movable electrode lead-wire 11 are provided for the fixed electrodes (n-type polysilicon film) 13 and the movable electrode (n-type polysilicon film portion) 16, respectively, wherein both the fixed electrodes and the movable electrode are lead out to be electrically connected to a capacitance detecting circuit (not shown).

MICROMACHINED CAPACITIVE RF PRESSURE SENSOR

CROSS REFERENCE TO RELATED APPLICATIONS

U.S. Pat. Nos. 6,631,645; 6,640,642; 5,619,476; 5,870,351; 5,894,452; 6,493,288.

BACKGROUND OF INVENTION

Figure 1:
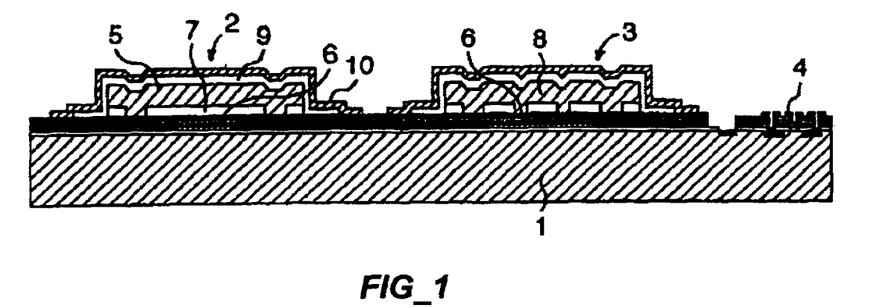
FIG. 1 is a cross sectional view of a prior art semiconductor pressure sensor.

Conventional techniques relevant to a pressure sensitive capacitance element are described in U.S. Pat. No. 6,631,645 that presents an electrostatic capacitance type pressure gauge manufactured through etching of a sacrificial layer, such as shown in FIG. 1. This pressure gauge is constituted of a pressure sensitive capacitance element 2 whose capacitance value changes with an applied pressure, and a reference capacitance element 3 although whose capacitance value is similar to that of the capacitance element 2 it does not change with the applied pressure. The structure and operation principle of this pressure gauge is also described in the said patent.

FIG. 1 is a cross sectional view of the prior art semiconductor pressure sensor gauge. On the surface of a silicon substrate 1, a pressure sensitive capacitance element 2, a reference capacitance element 3 and a capacitance-voltage conversion circuit 4 made of C-MOS are formed.

The pressure sensitive capacitance element 2 has a fixed electrode 6 embedded in the upper surface layer of the substrate, and a movable electrode 5. These electrodes are disposed faced each other via a small space 7 to constitute a capacitance element structure. Formed on the variable electrode 5 are a sealing film 9 for vacuum sealing the inside of the small space 7 and a shielding and surface passivation film 10 formed on the sealing film 9. The structure of the reference capacitance element 3 is similar to that of the pressure sensitive capacitance element 2. However, in place of the variable electrode 5, a fixed electrode 8 with support columns is used to constitute the capacitance element whose capacitance will not change with an applied pressure. The diameter of the fixed electrode of the reference capacitance element 3 is made longer than that of the fixed electrode of the pressure sensitive capacitance element 2.

FIG. 2 is a top plan see-through view of another prior art capacitance-type pressure sensor described in U.S. Pat. No. 6,640,642 and FIG. 3 is a sectional view of the same taken along a line A—A in FIG. 2. Referring to FIGS. 2 and 3, reference numeral 20 denotes a semiconductor substrate having one surface over which a silicon oxide film 12 is deposited as an insulation film. Disposed on the silicon oxide film 2 in a matrix-like pattern are n-type polysilicon films 13 which serve as electrodes (fixed electrodes), respectively, wherein the n-type polysilicon films 13 are electrically connected in parallel with one another, as can be seen in FIG. 2. Further formed or deposited over the silicon oxide film 12 and the n-type polysilicon films 3 is a silicon nitride film 14 as an insulation film that is to serve as an etching stopper when a cavity region 18 is formed.

Disposed internally of the cavity region 18 are n-type polysilicon film portions 17 that serve as diaphragm fixing portions for supporting a sheet of diaphragm while partitioning regionally the diaphragm into a plurality of diaphragm sections each of a predetermined size for a plurality of sensor unit regions, respectively. Further, provided over the cavity region 18 is an n-type polysilicon film portion 16 which constitutes a part of the diaphragm and which serves as an electrode (movable electrode).

Capacitive micromachined ultrasonic transducers have been emerging as an attractive alternative to piezoelectric transducers. They offer a larger set of parameters for optimization of transducer performance as well as ease of fabrication and electronic integration. The fabrication and operation of micromachined ultrasonic transducers have been described in many publications and patents. For example, U.S. Pat. Nos. 5,619,476; 5,870,351 and 5,894,452, incorporated herein by reference, describe the fabrication of capacitive-type ultrasonic transducers in which membranes are supported above a substrate by insulative supports such as silicon nitride, silicon oxide and polyamide. The supports engage the edges of each membrane. A voltage applied between the substrate and a conductive film on the surface of the membrane causes the membrane to vibrate and emit sound waves. The membranes can be sealed to provide operation of the transducers immersed in a liquid, as described in U.S. Pat. No. 6,493,288. The transducer may include a plurality of membranes of the same or different sizes and/or shapes. In operation, one or more multi-element transducers can be in arrays with the electrical excitation controlled to provide desired beam patterns.

Consider the traditional capacitor micromachined ultrasonic transducers (CMUT) described in U.S. Pat. Nos. 5,619,476, 5,870,351, 5,894,452 and 6,493,288. In particular, consider as a theoretical example a device made with 100 cells where each cell has a diameter of 200 $\mu$m, a gap of 0.5 $\mu$m, and a membrane thickness of 1 $\mu$m. Consider that, in this device, all the individual cells are sealed such that the gap of the capacitor is not open to the environment, and thus can survive humid, indeed even wet environments. When used as a receiver, using the traditional detection scheme, with a dc voltage of 30.745 volts applied across the cells with the output applied to an amplifier with the following characteristics: $R_{in}$=2 M$\Omega$, $C_{in}$=1 pF, $V_{noise}$=1.4 nV/Hz, and $I_{noise}$=0.01 pA/$\sqrt{\text{Hz}}$, the signal to noise ratio drops sharply for frequencies below 100 kHz. In other words, at frequencies lower than 100 KHz, a signal is received, but at much lower sensitivity.

Figure 4:
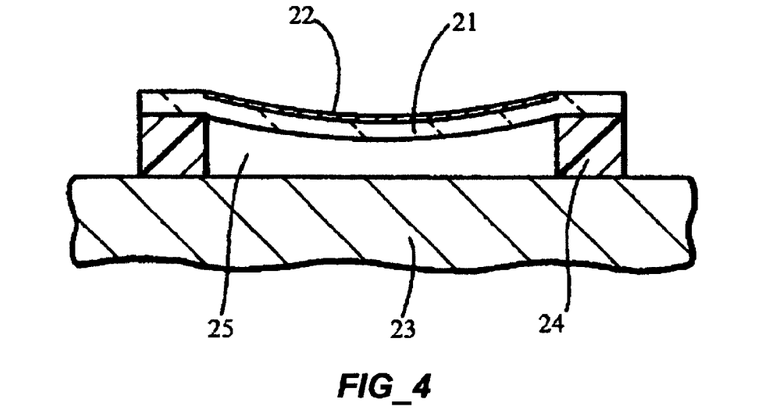
FIG. 4 is a cross-sectional view of a typical cell of a multi-cell. CMUT microphone.

Referring to FIG. 4, traditional micromachined capacitive ultrasonic sensors are made up of multiple small sealed, evacuated cells, each including a membrane 21 coated with a metal electrode 22. The membrane 21 is supported at its edges spaced from conductive base 23 by an insulating support 24. The interior volume 25 is evacuated. The geometry and the material of the membrane, and the surrounding medium determine the mechanical response of the microphone.

Indeed, the CMUT described in U.S. Pat. No. 6,493,288 provides a microphone that has wider operable frequency bandwidth in theory. However, such CMUT device is mainly invented to measure the acoustic signal whose pressure amplitude fluctuates in response to human voice or environmental noise. It addition, it only measures the relative pressure variation rather than the absolute pressure level for which a reference capacitor whose capacitance does not change with pressure must be provided.

SUMMARY OF INVENTION

It is an object of the present invention to provide a pressure sensor with micromachined capacitive elements for measuring absolute pressure level.

It is a further object of the present invention to provide a micromachined pressure sensor that comprises pressure sensitive capacitance elements and reference capacitance elements.

It is another object of the present invention to provide a micromachined pressure sensor that comprises a plurality of sealed micromachined capacitors whose capacitance varies in response to pressure variation and a plurality of micromachined capacitors whose capacitance does not change with pressure as reference capacitance elements.

It is a further object of the present invention to provide a micromachined pressure sensor that can be used in gas and fluid environment.

It is another object of the present invention to provide a pressure sensor system that comprises a scalable array of sealed micromachined cells in which the cavities can be evacuated or filled with gas or fluid.

It is a further object of the present invention to provide a pressure sensor for detecting pressure level and generating signals that can be transmitted to a remote receiver.

The foregoing and other objects of the invention are achieved by a micromachined pressure sensor including an array of sealed micromachined capacitive capsules each including a membrane supported above a common conductive electrode, and an array of micromachined elements each including a stack of film elements. Each membrane supports a conductive electrode for movement therewith, whereby each membrane electrode forms a capacitor with the common conductive electrode. The capacitance of the said capacitor varies with movement of the membrane responsive to the pressure level. Each film element also forms a capacitor with the common conductive electrode. The capacitance of the said film elements is insensitive to the pressure variation. Conductive lines interconnect said conductive electrodes to provide output signals.

BRIEF DESCRIPTION OF DRAWINGS

The foregoing and other objects of the invention will be more clearly understood from the following description when read in conjunction with the accompanying drawings of which.

DETAILED DESCRIPTION

Unlike the traditional micromachined pressure sensor, we approach the problem of making a good and practical pressure sensor from a different perspective. An alternative membrane structure that overcomes many of the drawbacks of conventional capacitive micromachined pressure sensor designs incorporates many smaller sealed membranes and reference cells. This type of structure it also has many important implications for pressure sensor performance over the conventional CMUT. First, it allows the measurement of absolute pressure levels, and any pressure fluctuations about that pressure level. Second, the cavity under the sealed membrane can be vacuum, filled with gas or fluid at various pressures to match the target environment of which its pressure level is to be measured. And last, the absence of frequency-dependent circuit elements of the back-chamber and pressure equalization vents in the circuit model suggests that the uniformity of the frequency response is also improved. Unlike standard unsealed pressure sensors, the sealed CMURF structure does not have a low-frequency pressure roll-off. In fact, the membrane responds to excitations at arbitrarily low frequencies, including atmospheric pressure fluctuations.

It is seen that the condenser pressure sensor is a simple parallel plate capacitor. An incoming pressure signal vibrates the membrane, which results in a change in the total capacitance at the incoming pressure signal frequency. The membrane vibrations are measured by measuring the change in the total capacitance, which is approximately a linear function of the membrane displacement due to pressure change. This is accomplished typically by measuring the current output of the pressure sensor under a constant bias voltage applied across the parallel plates. For a circular membrane, the low-frequency displacement response is roughly proportional to its area. Therefore, the use of N small cell membranes, rather than a single membrane of the same total area, reduces the displacement and the expected change in capacitance by a factor of N. This illustrates the primary tradeoff for the uniform, durable response provided by CMURF membranes. Fortunately, the expected mechanical noise of the sealed CMURF structure is extremely small, which suggests that a sensitive pressure sensor remains possible. A Radio Frequency (RF) detection technique compensates for the small displacement response of the membranes with a sensitive method for detecting slight capacitance changes.

Figure 5:
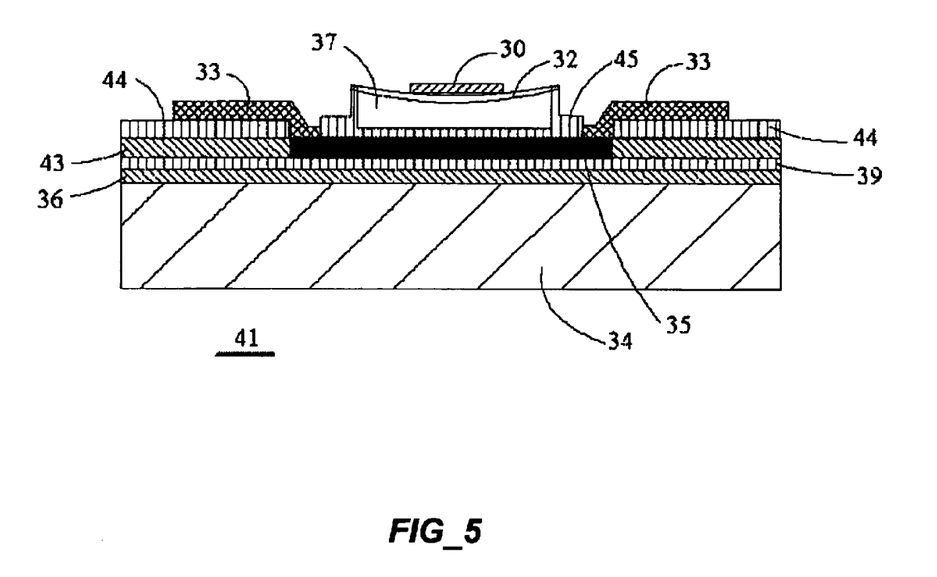
FIG. 5 shows a cross-sectional view of a typical measurement cell according to the preferred embodiment of the present invention.
Figure 7:
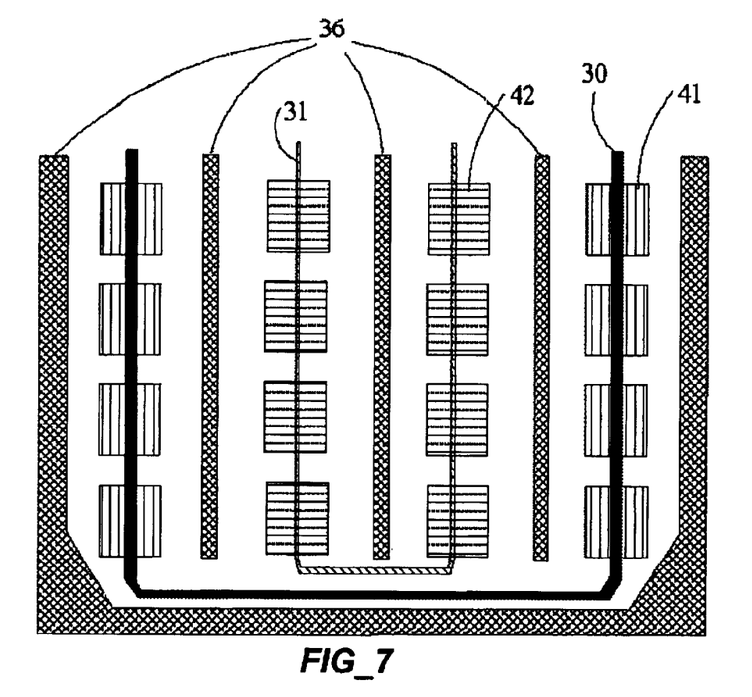
FIG. 7 is the mask structure illustrating a CMURF pressure sensor die including a plurality of serially connected pressure sensitive capacitor cells and pressure insensitive reference cells.

In RF detection, tens or hundreds of capacitive membranes are periodically spaced along an RF transmission line, creating a capacitively loaded transmission line. The transmission line structure is implemented using a coplanar wave-guide transmission line over CMURF membranes, as shown in FIGS. 5 and 7. It consists of a series of surface-micromachined membranes 32 covered by a coplanar wave-guide transmission line, which consists of three conductors: a center signal line 30 that traverses the membranes 32 and one ground line 33 on either side of a row of membranes. The lower electrode 35 of each capacitive membrane is formed by a locally doped polysilicon layer that extends underneath the center portion of the membrane to the ground lines 33. Polysilicon is used for this conductor instead of metal because the high deposition temperature of silicon nitride for the membrane exceeds the melting temperatures of common metals.

Figure 6:
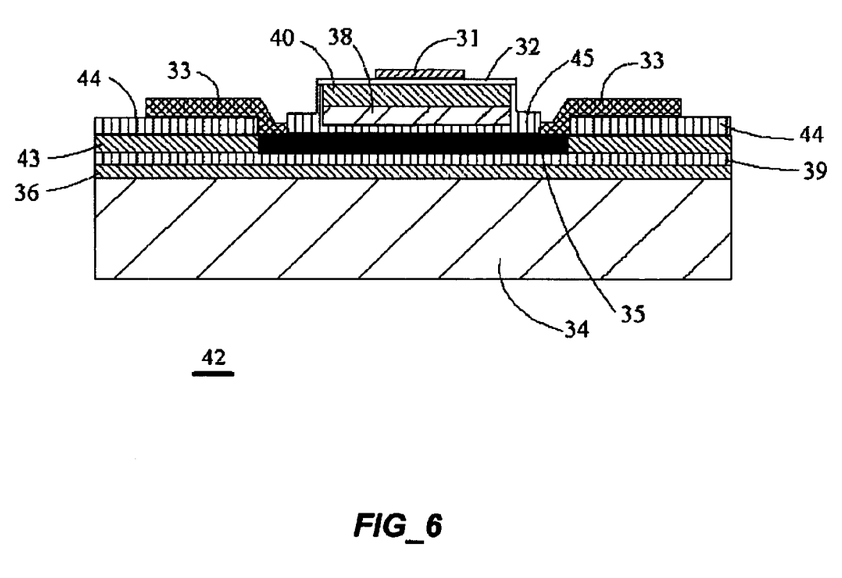
FIG. 6 shows a cross-sectional view of a typical reference cell according to the preferred embodiment of the present invention.

Tens or hundreds of film stacks are also periodically spaced along another RF transmission line, creating a reference transmission line. This second transmission line structure is implemented using a similar coplanar waveguide transmission line over CMURF reference cells, as shown in FIGS. 6 and 7. It consists of a series of surface-micromachined film stacks covered by a coplanar waveguide transmission line, which consists of three conductors: a center signal line 31 that traverses the membranes 32 and one ground line 33 on either side of a row of membranes. The lower electrode 35 of each capacitive membrane is formed by a locally doped polysilicon layer that extends underneath the center portion of the membrane to the ground lines 33. The film stack is consisted of membranes 32, polysilicon layer 38 and low-temperature oxide layer 40. Polysilicon is again used for this conductor instead of metal because the high deposition temperature of silicon nitride for the membrane exceeds the melting temperatures of common metals.

The processing steps for the measurement cells 41 are different from others for RF detection. An insulating, high-resistivity (2000 $\Omega$-cm) silicon substrate is suitable for low-loss coplanar transmission lines at several GHz, as it reduces the power dissipated by induced currents in the substrate. The silicon substrate 34 is coated with insulating films of silicon nitride 39 and polysilicon 36, both deposited using low-pressure chemical vapor deposition (LPCVD). Another polysilicon layer 43 is deposited on top of silicon nitride 39. Sections 35 of the polysilicon layer 39 under the membranes are doped in a high temperature furnace with phosphorous oxychloride, using silicon dioxide to mask areas of the polysilicon that should act as electrical insulators. Following a thin silicon nitride 44 depositions, which serves as an etch-stop, the membrane structure 45 is formed by depositing silicon nitride 32 over patterned sacrificial layers of polysilicon 38 and low-temperature oxide 40. Small via holes are plasma-etched at the side of the nitride membrane, which permit the subsequent wet etch of the sacrificial layers to release the membrane 32. The etching is accomplished with potassium hydroxide followed by hydrofluoric acid, producing the membrane structure of FIG. 5. A second deposition of silicon nitride seals the etch holes, and because the deposition occurs in a vacuum furnace, the membrane structure forms vacuum-sealed void 37. The sealed nitride membrane 32 is etched to its final thickness to obtain the desired deflection and stiffness. A plasma etch opens contacts to the doped polysilicon electrode 35 that extends underneath the membrane. Finally, FIG. 5 shows the cross section of a complete structure after patterning the metal transmission lines of sputtered aluminum, which serve as signal line 30.

The processing steps for the reference cells 42 are pretty much the same as those for the measurement cells except that the patterned sacrificial layers of polysilicon 38 and low-temperature oxide 40 are not etched to form the film stacks. A second deposition of silicon nitride is then deposited. This nitride layer is etched to the same thickness of the membrane 32 in measurement cells. A plasma etch opens contacts to the doped polysilicon electrode 35 that extends underneath the membrane. Finally, FIG. 6 shows the cross section of a complete structure after patterning the metal transmission lines of sputtered aluminum, which serve as signal line 31.

The fabricated pressure sensor die is mounted and packaged to a printed circuit board chip that has detection signal processing electronics. FIG. 7 shows a mask layout of such pressure sensor: measurement cells 41 and reference cells 42 load two separate transmission lines.

Figure 8:
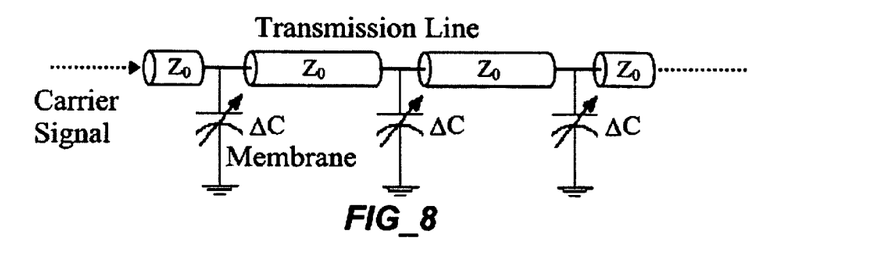
FIG. 8 shows an equivalent transmission line structure representative of pressure sensor arrays of FIG. 5 and 6.

Micromachined CMURF pressure sensors capacitively load transmission line with capacitive membranes. This structure, as shown in FIG. 8, acts as a filter for millimeter-wave microwave signals, but still behaves as a transmission line for RF signals within its pass-band. Where in the FIG. 8, $Z_0$ is the characteristic impedance of a section of transmission line formed by an individual pressure sensor cell, and $\Delta C$ is the change of capacitance of in the pressure sensor. As the capacitive membranes in the line vibrate due to ambient pressure, the transmission line"s propagation constant, or equivalently, the phase velocity of the RF signal also changes. Thus, an RF carrier signal that is launched down the loaded transmission line is phase modulated by the pressure signal that impinges on the capacitive membranes. Subsequent demodulation using a phase detection circuit recovers the pressure signal.

Figure 9:
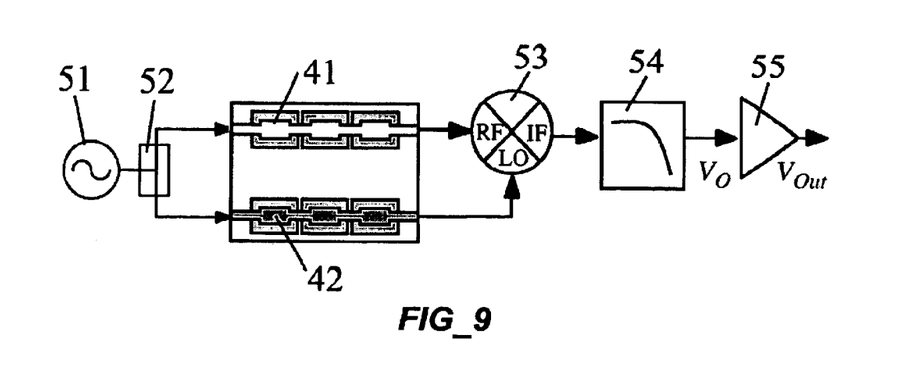
FIG. 9 shows the RF detection circuitry for the micromachined CMURF pressure sensor.

The phase modulation of the RF carrier can be sensed when the measurement cell is included as part of a phase detection circuit, such as the one shown in FIG. 9. The circuit first splits through a splitter 52 the RF signal from an oscillator 51 into two branches. One branch passes through the measurement cells 41, which phase modulates the RF signal by the pressure signal on the CMURF membranes. Mathematically, this signal takes the form $$V_{RF} = V_1 \cos(2\pi f_c t + \Phi(t)) \tag{1}$$

where $V_1$ and $f_c$ are the amplitude and frequency of the RF carrier, respectively, and $\Box$ (t) represents some time-varying phase modulation due to an pressure signal. The second branch transfers a reference signal through reference cells 42 to the local oscillator (LO) port of the mixer 53 given by $$V_{LO} = V_2 \cos(2\pi f_c t + \phi) \tag{2}$$

where $V_2$ is the amplitude of the voltage signal and $\phi$ represents some fixed phase reference relative to the signal $V_{RF}$. Ideally, the mixer 53 performs multiplication of the signals at its input ports, resulting in output components at the sum and difference of the input frequencies, with the voltage amplitude $K_d$:

$$V_{RF} \times V_{LO} = K_d [\cos(\Phi(t)-\phi) + \cos(4\pi f_c t + \Phi(t)+\phi)] \tag{3}$$

A low-pass filter 54 at the mixer output removes the component of the signal at twice the carrier frequency, $2f_c$, as well as any additional higher-order harmonics that may be generated. The demodulated (or base-band) signal, $$V_O = K_d \cos(\Phi(t)-\phi) \tag{4}$$

consists of a phase varying term $\phi(t)$ and a fixed phase reference $\phi$. If $\phi$ is adjusted to $\Pi/2$ rad so that the two signals at the mixer inputs are in quadrature, the demodulated signal VO is proportional to the small phase variations of $\phi(t)$:

$$V_O = K_d \cos(\Phi(t)) \approx K_d \Phi(t) \tag{5}$$

Because $\phi(t)$ is proportional to the change in capacitance, recovering $\phi(t)$ recovers the pressure signal on the membranes. The scaling term $K_d$ acts as the phase detection constant for the mixer, with units of V/rad, and converts radian phase shifts of the RF carrier into a base-band voltage signal. Additional amplification by amplifier 55 increases the signal to the desired level.

Although more complicated than the constant voltage detection systems usually applied to condenser pressure sensors, the RF detection system has some distinct advantages. First, any interconnect capacitance between membranes cells is incorporated into the RF transmission line structure. This is particularly relevant for a pressure sensor composed of many interconnected capacitors such as CMURFs because any parasitic capacitance degrades the sensitivity in constant voltage detection. A DC voltage bias is not required for operation, although a voltage can be applied to the measurement cells to adjust the membrane deflection and alter its sensitivity or calibration. In addition, the output impedance of the mixer in RF detection is low-impedance, typically around 50Ω, so an amplifier with a high-impedance input is unnecessary. Finally, the output is independent of pressure frequency variations in $\phi(t)$, so the low-frequency response of the CMURF structure is preserved for a broadband pressure sensor. Since the reference phase $\phi$ provided by the reference cells is fixed, the circuit in FIG. 9 can detect an absolute pressure level imposed on the measurement cells.

Figure 10:
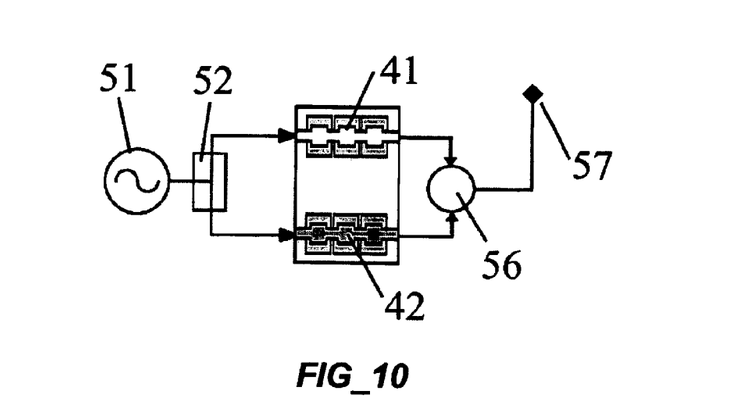
FIG. 10 shows the RF transmitting circuit according to another preferred embodiment of the present invention.
Figure 11:
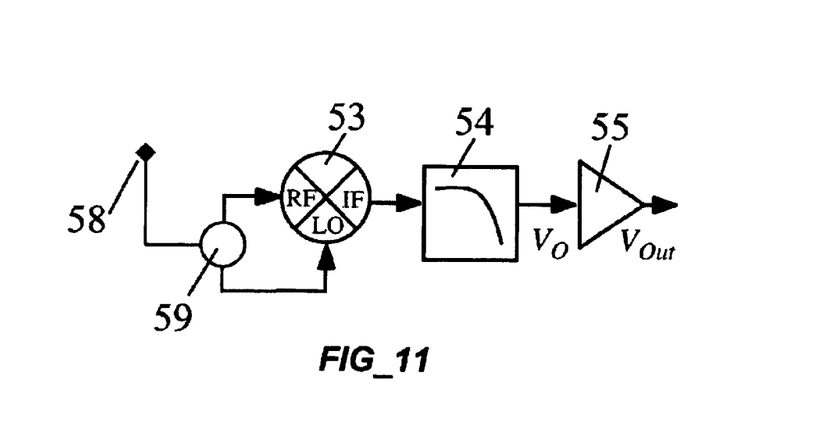
FIG. 11 is the RF receiving circuit that works with the circuit in FIG. 10 according to another preferred embodiment of the present invention.

Phase modulation signals from measurement cells 41 and reference cells 42 can also be relayed into a multiplexer 56. The signals can then be transmitted into open space with an antenna 57. This wireless transmission circuit is described in FIG. 10. As depicted in FIG. 11, such wireless signal can then be detected using a second antenna 58. The decoder 59 decodes the signal from antenna 58, and passes the signals to the RF port and local port of mixer 53. The mixer 53 performs multiplication of the signals at its input ports, resulting in output components at the sum and difference of the input frequencies. A low-pass filter 54 at the mixer 53 output removes the component of the signal at twice the carrier frequency, $2f_c$, as well as any additional higher-order harmonics that may be generated. Additional amplification by amplifier 55 increases the signal to the desired level. FIGS. 10 and 11 forms a complete set of transmitting and receiving circuits that enable the wireless detection of pressure imposed on the CMURF pressure sensors.

The propagation constant in rad/m of an unloaded RF transmission line is $2\pi f_c \sqrt{L_t C_t}$, where $f_c$ is the RF carrier frequency, $L_c$ and $C_t$ are the inductance and capacitance of transmission line, respectively. To determine the effects of the membrane capacitors, the total length of the unloaded transmission line can be viewed as a composite of N sections of line, each of length d. The phase length of the capacitively loaded transmission line is calculated by incorporating a single membrane capacitor into each section of the lumped, reactive transmission line model. Thus, the total radian phase length of the loaded line becomes $$\Phi = 2\pi f_c N \sqrt{L_{td(C_{td}+C_m)}} \tag{6}$$

One approach to calculating the phase shift $\phi$ due to pressure pressure subtracts the phase length of the line, loaded with membrane static capacitance $C_m$, from that loaded with $C_m + \Delta C_m$, as shown below:

$$\Delta\Phi = 2\pi f_c N [\sqrt{L_{td(C_{td}+C_m+\Delta C_m)}} - \sqrt{L_{td(C_{td}+C_m)}}] \tag{7}$$

where $\Delta C_m$ is the change in membrane capacitance. However, a simpler approximate expression for $\Delta\phi$ can be obtained in terms of the characteristic impedance of the loaded transmission line impedance $Z_L$. Differentiating Equation (6) with respect to $C_m$ and linearizing the expression for small changes in capacitance yields $$\Delta\Phi \approx \frac{\pi f_c N \sqrt{L_t}}{\sqrt{C_t}\sqrt{1+\frac{C_m}{C_t d}}} \Delta C_m \tag{8}$$

If $C_m$ is small relative to the capacitance of a section of the unloaded transmission line, then the $C_m/(C_t d)$ term can be neglected. Simplifying the resulting expression and substituting the loaded line impedance $Z_L \approx Z_0 = \sqrt{L_t/C_t}$, Equation (8) becomes $$\Delta\Phi \approx \pi f_c N Z_L \Delta C_m \tag{9}$$

If $C_m$ instead dominates the unloaded transmission line capacitance of the section, then the fraction $C_m/(C_t d)$ dominates the radicand in the denominator of Equation (8). The loaded line impedance also is dominated by $C_m$, so $Z_L \approx \sqrt{L_t d/C_m}$. Replacing $\sqrt{L_t d/C_m}$ with $Z_L$ yields the same expression in Equation (9). Therefore, Equation (9) can be used to compute the approximate phase shift in both cases. More importantly, the expression predicts that the phase shift is proportional to the fluctuation in membrane capacitance $\Delta C_m$, the number of membranes N, and the RF carrier frequency $f_c$.

Either Equations (8) or (9) may be used to calculate the phase shift using the device parameters. With a phase detection circuit operating at 2.8 GHz, the expected phase shift amplitude for the fabricated pressure sensor is 58.6 $\mu$rad for 1 Pa rms pressure pressure. The calculated loaded line impedance is 34.5Ω, which is sufficiently similar to the typical 50Ω impedances of other RF circuit components to obviate the need for impedance-matching networks in the phase detection circuit.

The use of sealed CMURF membranes in the pressure sensor provides a uniform, wideband response to pressure while sealing out particle contamination and humidity. The use of reference cells can also offset the measurement errors due to the temperature variation. As the temperature fluctuates, both measurement cells 41 and reference cells 42 will experience the same effect since they are essentially made of the same materials and with the same film thickness.

The phase shift of the RF carrier due to the pressure sensor transmission line structure can be increased by using higher RF frequencies. Because the phase shift is proportional to $f_c$, as shown in Equation (9), each doubling of frequency increases the signal level by up to 6 dB if $K_d$ is unchanged. However, the optimum RF frequency balances the increase in phase shift with the increase in RF loss through the transmission line structure and any increase in the noise floor of the detection electronics at higher operating frequencies.

In addition to increasing the phase shift due to the pressure sensor transmission line, the sensitivity of the phase detection circuitry can also improve the overall pressure sensor sensitivity. More sophisticated circuit topologies suppress the carrier through an RF interferometer. Because the suppressed carrier prevents saturation of the mixer, it is possible to amplify the phase modulation signal at RF frequencies prior to the mixer, which introduces most of the electrical noise. Since low-noise, narrowband amplifiers are available at RF frequencies, the effects of the mixer 1/f noise and base-band amplifier noise are mitigated, and the system noise floor can approach that of fundamental electrical thermal noise limits.

The foregoing descriptions of specific embodiments of the present invention are presented for the purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A micromachined capacitive pressure sensor including:
   a plurality of sealed micromachined capacitive cells of type 1, each cell including a rectangular membrane supported above a common conductive electrode by an insulating support and each membrane supporting a conductive electrode for movement therewith whereby each electrode forms with the common conductive electrode a capacitor whose capacitance varies with movement of the membrane relative to the common electrode;
   a cavity region formed by the said membrane and the said conductive electrode; and
   conductive lines interconnecting conductive electrodes of adjacent cells of type 1;
   a plurality of micromachined capacitive cells of type 2, each cell including a rectangular film stack on a common conductive electrode by an insulating support and each stack supporting a conductive electrode therewith whereby each electrode forms with the common conductive electrode a capacitor whose capacitance does not vary with movement of the film stack; and
   conductive lines interconnecting conductive electrodes of adjacent cells of type 2.

2. A micromachined capacitive pressure sensor as in claim 1 in which the cells of type 1 and type 2 are arranged in a plurality of two-dimensional matrix.

3. The method of operating a micromachined capacitive pressure sensor of the type that includes:
   a plurality of micromachined capacitive cells of type 1 arranged in a two-dimensional matrix over a broad frequency band, said cells each comprising a membrane supported by an insulating support above a common conductive electrode with a conductive electrode on each of said membranes to form with said spaced common electrode a capacitor;
   a plurality of micromachined capacitive cells of type 2 arranged in a two-dimensional matrix over a broad frequency band, said cells formed with film stacks on a common conductive electrode by an insulating support and each stack supporting a conductive electrode therewith whereby each electrode forms with the common conductive electrode a capacitor;
   said method comprising connecting said cells of type 1 and type 2 in series with conductive connecting lines whereby said connecting lines and said capacitors form a high frequency transmission line whose length varies with changes in the capacitance of said cells type 1 and type 2 and inductance of said lines,
   applying a high frequency RF voltage to said high frequency transmission lines, and
   determining the change in electrical length of the lines responsive to a received pressure signal to provide an output signal representative of the pressure signal.

4. A micromachined capacitive pressure sensor including:
   a plurality of micromachined capacitive pressure sensor cells of type 1 arranged in a two-dimensional matrix, each cell including a membrane supported above a common conductive electrode by an insulating support and each membrane supporting a conductive electrode for movement therewith whereby each electrode forms with the common conductive electrode a capacitor whose capacitance varies with movement of the membrane relative to the common electrode,
   a plurality of micromachined capacitive cells of type 2 arranged in a two-dimensional matrix, each cell including a rectangular film stack on a common conductive electrode by an insulating support and each stack supporting a conductive electrode therewith whereby each electrode forms with the common conductive electrode a capacitor whose capacitance does not vary with movement of the film stack;
   a conductive line interconnecting all conductive electrodes of cells of type 1 in said array in series, whereby the inductance of said conductive line and the capacitance of said capacitors form a high frequency transmission line whose electrical length changes in responsive to movement of said membrane.
   a conductive line interconnecting all conductive electrodes of cells of type 2 in said array in series, whereby the inductance of said conductive line and the capacitance of said capacitors form a high frequency transmission line whose electrical length does not change in responsive to movement of said film stack.
   a co-planar structure forming a high frequency transmission line interconnecting all conductive electrodes of cells of types 1 and 2 in said array in series.

5. A micromachined capacitive pressure sensor as in claim 4 in which the cells of type 1 and type 2 are arranged in a scalable two-dimensional matrix.

6. A micromachined capacitive pressure sensor as in claim 4 or 5 in which the membranes and film stacks are rectangular, with the longer end along with the transmission lines.

7. The method of operating a micromachined capacitive pressure sensor of the type which includes a plurality of micromachined capacitive cells of type 1 and type 2 arranged in a two-dimensional matrix over a broad frequency band, said cells of type 1 each comprising a membrane supported by an insulating support above a common conductive electrode with a conductive electrode on each of said membranes to form with said spaced common electrode a capacitor, said cells of type 2 comprising a rectangular film stack supported by an insulating support on a common conductive electrode with a conductive electrode on each of said film stack to form with said spaced common electrode a capacitor,
   said method comprising:
   connecting said cells of type 1 and type 2 in series with conductive connecting lines whereby said connecting lines and said capacitors form a high frequency transmission line whose length varies with changes in the capacitance of said cells of type 1 and type 2 and inductance of said lines,
   applying a high frequency RF voltage to said high frequency transmission lines,
   determining the change in electrical length of the line formed by said cells of type 1 in responsive to a received pressure signal to provide an output signal representative of the pressure signal, and means of connected to said transmission lines for determining the absolute pressure level.

8. The method of operating a micromachined capacitive pressure sensor of the type which includes a plurality of micromachined capacitive cells of type 1 and type 2 arranged in a two-dimensional matrix over a broad frequency band, said cells of type 1 each comprising a membrane supported by an insulating support above a common conductive electrode with a conductive electrode on each of said membranes to form with said spaced common electrode a capacitor, said cells of type 2 comprising a rectangular film stack supported by an insulating support on a common conductive electrode with a conductive electrode on each of said film stack to form with said spaced common electrode a capacitor, said method comprising:

connecting said cells of type 1 in series with conductive connecting lines whereby said connecting lines and said capacitors form a high frequency transmission line whose length varies with changes in the capacitance of said cells of type 1 and inductance of said lines, connecting said cells of type 2 in series with conductive connecting lines whereby said connecting lines and said capacitors form a high frequency transmission line whose length varies with changes in the capacitance of said cells of type 2 and inductance of said lines, applying a high frequency RF voltage to said high frequency transmission lines, determining the change in electrical length of the lines formed by said cells of type 1 relative to the lines formed by said cells of type 2 in responsive to a received pressure signal to provide an output signal representative of the pressure signal, and means of connected to said transmission lines for determining the absolute pressure level.

9. A method of claim 8 including an additional pair of transmitting and receiving antennas to allow the determination of pressure signal remotely.

* * * * *